United States Patent
Lee et al.

(10) Patent No.: US 10,292,081 B2
(45) Date of Patent: May 14, 2019

(54) METHOD AND APPARATUS FOR PERFORMING PARTIAL HANDOVER FOR CONTINUOUS DATA TRANSMISSION IN WIRELESS COMMUNICATION SYSTEM

(71) Applicant: LG ELECTRONICS INC., Seoul (KR)

(72) Inventors: Youngdae Lee, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/887,920

(22) Filed: Feb. 2, 2018

(65) Prior Publication Data
US 2018/0227819 A1 Aug. 9, 2018

Related U.S. Application Data

(60) Provisional application No. 62/454,109, filed on Feb. 3, 2017.

(51) Int. Cl.
| | |
|---|---|
| *H04W 36/00* | (2009.01) |
| *H04W 36/18* | (2009.01) |
| *H04W 36/36* | (2009.01) |
| *H04W 36/28* | (2009.01) |
| *H04W 36/02* | (2009.01) |

(52) U.S. Cl.
CPC ....... *H04W 36/18* (2013.01); *H04W 36/0016* (2013.01); *H04W 36/0061* (2013.01);
(Continued)

(58) Field of Classification Search
CPC . H04W 36/0055; H04W 76/20; H04W 36/08; H04W 76/19; H04W 12/04;
(Continued)

(56) References Cited

U.S. PATENT DOCUMENTS

| | | | |
|---|---|---|---|
| 2013/0176988 A1* | 7/2013 | Wang | H04W 28/08 370/331 |
| 2015/0208235 A1* | 7/2015 | Ingale | H04W 12/04 455/411 |

(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), Section 5.3.5.4 of 3GPP TS 36.331 V14.1.0, Dec. 2016, 23 pages.

(Continued)

*Primary Examiner* — Daniel Lai
(74) *Attorney, Agent, or Firm* — Lee Hong Degerman Kang Waimey

(57) ABSTRACT

For continuous data transmission during a handover procedure, Make-Before-Break handover may be introduced, which maintains source evolved NodeB (eNB) connection after reception of radio resource control (RRC) message for handover. In order to reduce ambiguity of Make-Before-Break handover, the present invention provides receiving a handover command from a network, after receiving the handover command from the network, keeping exchanging data with a source cell, stopping exchanging data with the source cell when a condition is met, and after stopping exchanging data with the source cell, starting exchanging data with a target cell.

12 Claims, 7 Drawing Sheets

(52) U.S. Cl.
CPC ........... *H04W 36/28* (2013.01); *H04W 36/36* (2013.01); *H04W 36/0069* (2018.08); *H04W 36/023* (2013.01)

(58) Field of Classification Search
CPC ............. H04W 76/25; H04W 36/0011; H04W 36/0027; H04W 36/0072; H04W 36/165; H04W 36/00; H04W 36/0022; H04W 36/0033; H04W 36/0083; H04W 36/02; H04W 36/026; H04W 36/16; H04W 36/18; H04W 36/26; H04W 36/34; H04W 36/0061; H04W 36/023; H04W 36/36
See application file for complete search history.

(56) References Cited

U.S. PATENT DOCUMENTS

| | | | |
|---|---|---|---|
| 2016/0192261 A1* | 6/2016 | Wang | H04W 36/0055 370/331 |
| 2016/0262066 A1* | 9/2016 | Ozturk | H04W 36/08 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), Section 5.3.10.10 of 3GPP TS 36.331 V14.1.0, Dec. 2016, 21 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Section 10.1.2.1 of 3GPP TS 36300 V14.1.0, Dec. 2016, 19 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14), Section 10.1.2.8.4 of 3GPP TS 36.300 V14.1.0, Dec. 2016, 16 pages.

* cited by examiner

METHOD AND APPARATUS FOR PERFORMING PARTIAL HANDOVER FOR CONTINUOUS DATA TRANSMISSION IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/454,109, filed on Feb. 3, 2017, the contents of which are hereby incorporated by reference herein in its entirety.

BACKGROUND OF THE INVENTION

Field of the Invention

The present invention relates to wireless communications, and more particularly, to a method and apparatus for performing a partial handover for continuous data transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Handover is a process of transferring an ongoing data session/call from one (source) cell connected to the core network to another (target) cell. Handovers are needed when a user equipment (UE) moved out of its serving cell's coverage or for load balancing purposes. In mobile communication, handover can either be network controlled (i.e. handover decision is with network) or mobile evaluated (i.e. UE makes handover decision and inform network to arrange resources on target cells). LTE uses both the approaches in a way that, LTE capable UE sends measurement report to network and based on this report, network directs UE to move to a target cell.

Seamless/lossless handover is when a handover from one cell to another takes place without a perceivable interruption of the radio connection. Various studies have been discussed for seamless/lossless handover.

SUMMARY OF THE INVENTION

The present invention provides a method and apparatus for performing a partial handover for continuous data transmission in a wireless communication system.

In an aspect, a method for performing a make-before-break handover by a user equipment (UE) in a wireless communication system is provided. The method includes receiving a handover command from a network, after receiving the handover command from the network, keeping exchanging data with a source cell, stopping exchanging data with the source cell when a condition is met, and after stopping exchanging data with the source cell, starting exchanging data with a target cell.

In another aspect, a user equipment (UE) in a wireless communication system is provided. The UE includes a memory, a transceiver, and a processor, operably coupled to the memory and the transceiver, that controls the transceiver to receive a handover command from a network, after receiving the handover command from the network, control the transceiver to keep exchanging data with a source cell, control the transceiver to stop exchanging data with the source cell when a condition is met, and after stopping exchanging data with the source cell, control the transceiver to start exchanging data with a target cell.

DESCRIPTION OF EXEMPLARY EMBODIMENTS

The following description will focus on 3rd generation partnership project (3GPP) long-term evolution (LTE) advanced (LTE-A). However, technical features of the present invention are not limited thereto, and may be applied to other various technologies.

Figure 1:
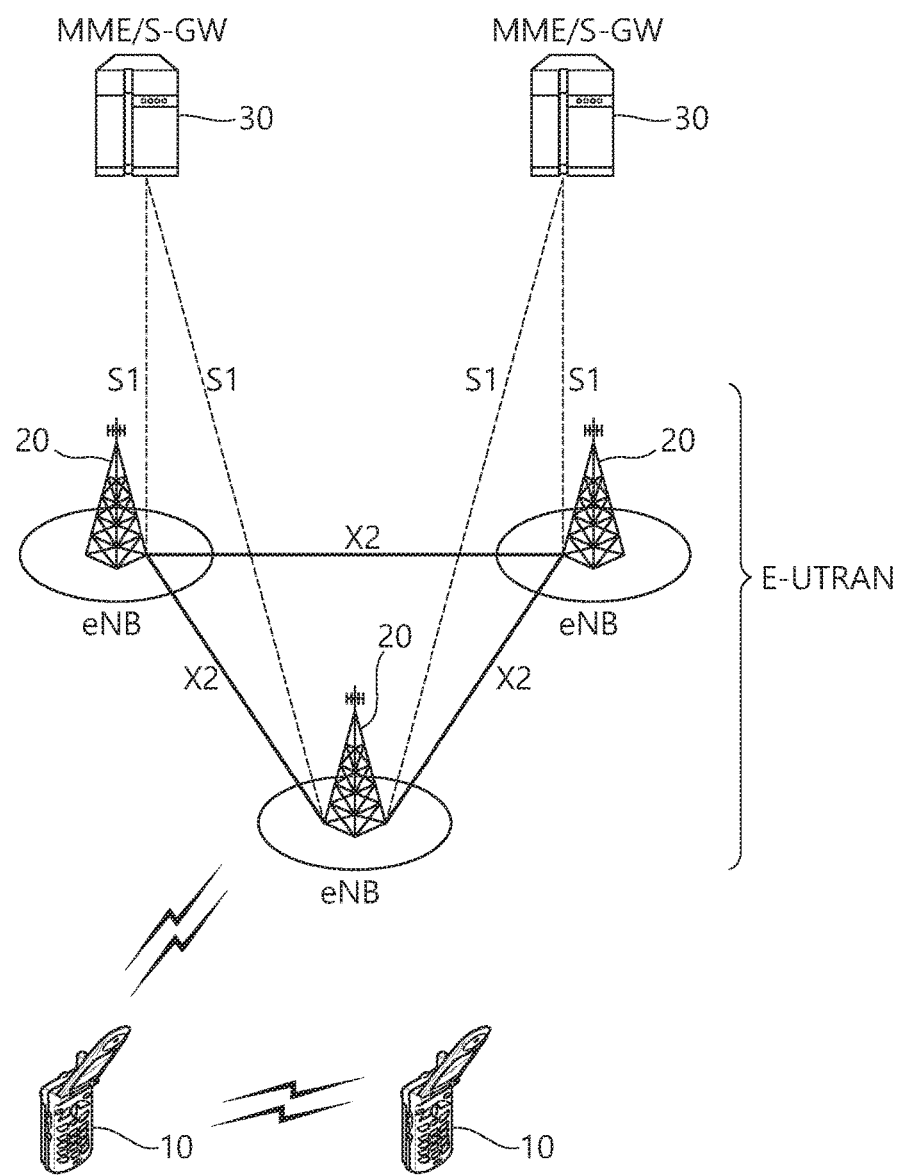
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
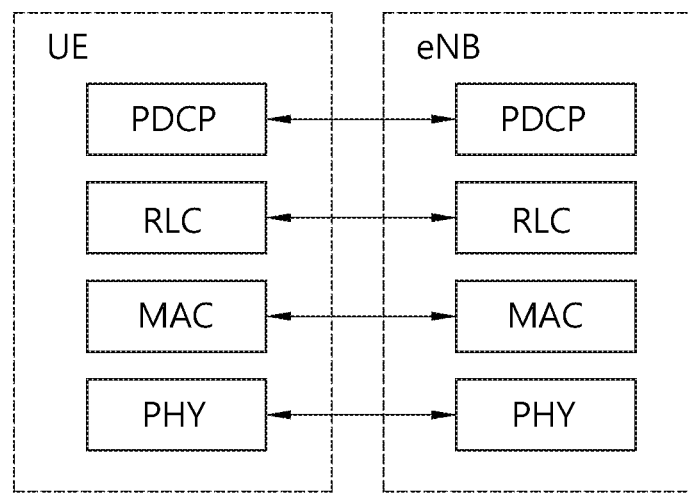
FIG. 2 shows a block diagram of a user plane protocol stack of an LTE system.
Figure 3:
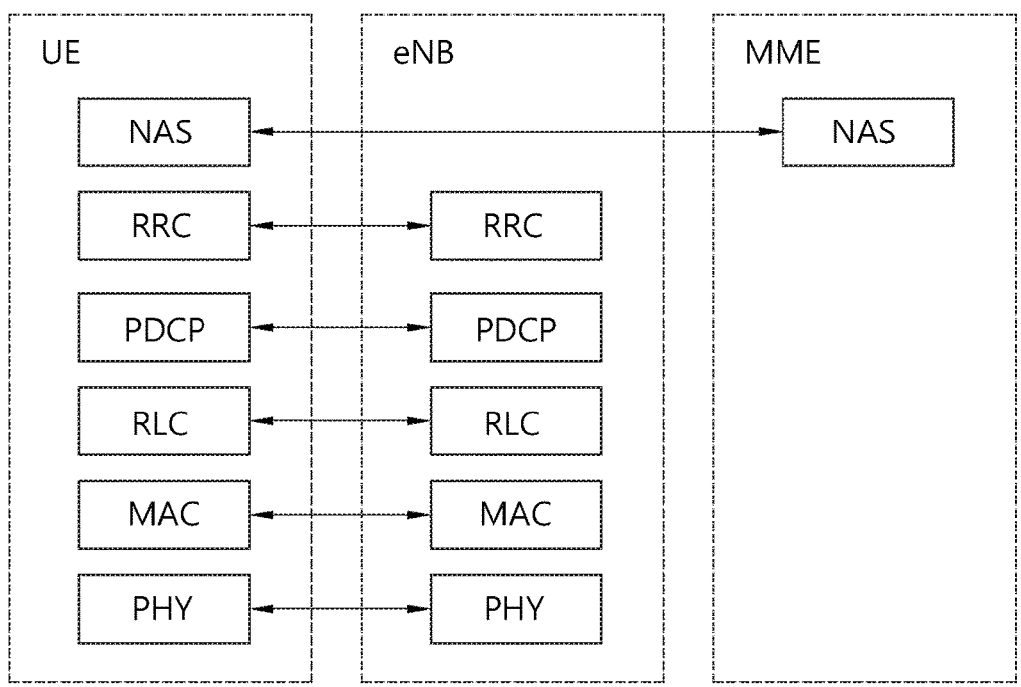
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Handover procedure is described. It may refer to Section 10.1.2.1 of 3GPP TS 36.300 V14.1.0 (2016-12) and Section 5.3.5.4 of 3GPP TS 36.331 V14.1.0 (2016-12). The intra E-UTRAN handover of a UE in RRC_CONNECTED state is a UE-assisted network-controlled handover, with handover preparation signaling in E-UTRAN. Part of the handover command comes from the target eNB and is transparently forwarded to the UE by the source eNB. To prepare the handover, the source eNB passes all necessary information to the target eNB (e.g. E-UTRAN radio access bearer (E-RAB) attributes and RRC context). When carrier aggregation (CA) is configured and to enable secondary cell (SCell) selection in the target eNB, the source eNB can provide in decreasing order of radio quality a list of the best cells and optionally measurement result of the cells. When dual connectivity (DC) is configured, the source master eNB (MeNB) provides the secondary cell group (SCG) configuration (in addition to the master cell group (MCG) configuration) to the target MeNB. Both the source eNB and UE keep some context (e.g. C-RNTI) to enable the return of the UE in case of handover failure. UE accesses the target cell via RACH following a contention-free procedure using a dedicated RACH preamble or following a contention-based procedure if dedicated RACH preambles are not available. The UE uses the dedicated preamble until the handover procedure is finished (successfully or unsuccessfully). If the RACH procedure towards the target cell is not successful within a certain time, the UE initiates radio link failure recovery (RLF) using a suitable cell. No robust header compression (ROHC) context is transferred at handover. ROHC context can be kept at handover within the same eNB.

The preparation and execution phase of the handover procedure is performed without EPC involvement, i.e. preparation messages are directly exchanged between the eNBs. The release of the resources at the source side during the handover completion phase is triggered by the eNB.

Figure 4:
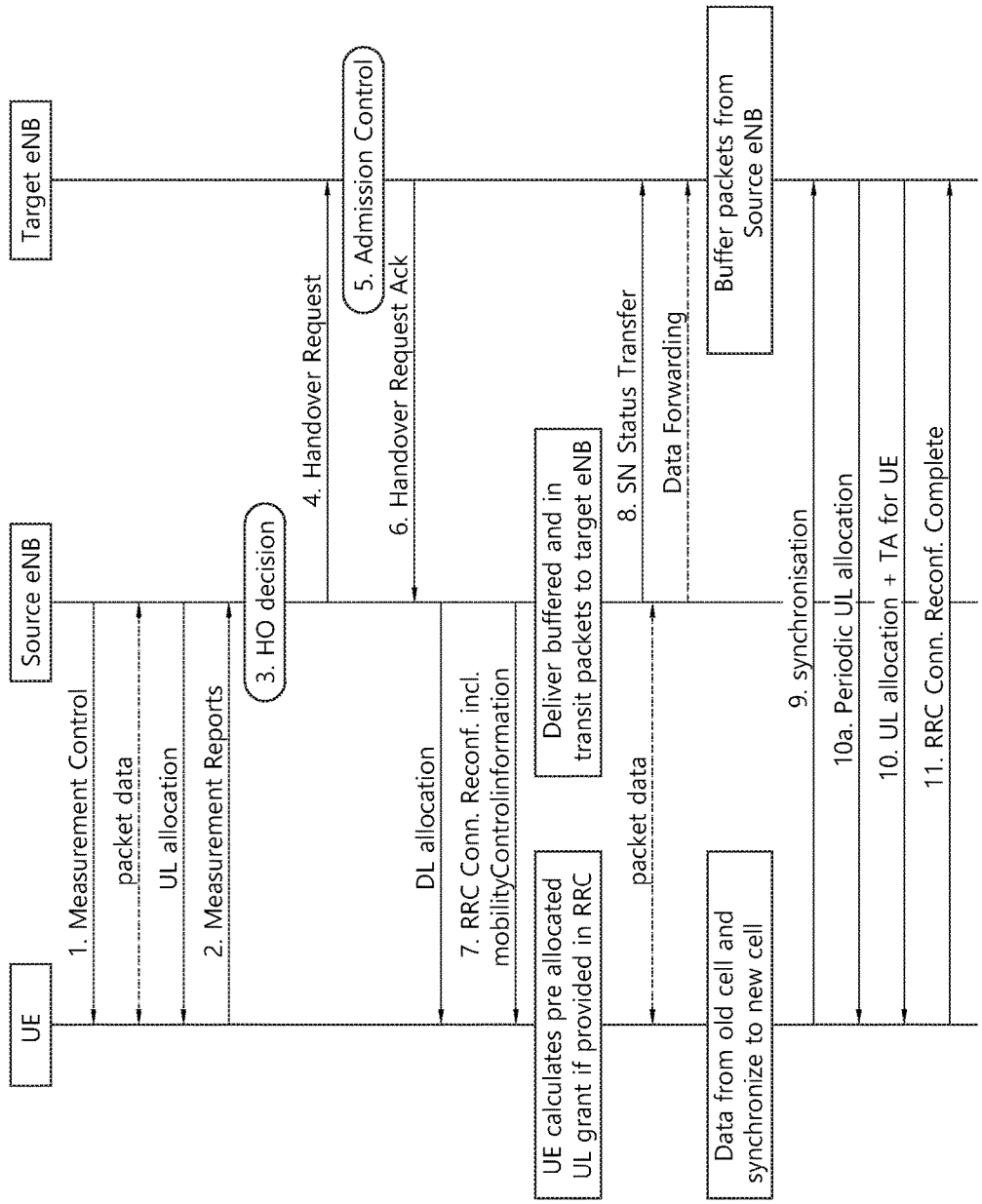
FIG. 4 shows a part of intra-MME/S-GW handover procedure.

FIG. 4 shows a part of intra-MME/S-GW handover procedure. FIG. 4 only describes a handover preparation phase and a handover execution phase, in which the EPC does not involve. But FIG. 4 does not describe a handover completion phase, in which the EPC involves. Accordingly, only UE, source eNB and target eNB are described in FIG. 4.

Steps 1 to 6 correspond to a handover preparation phase.

1. The source eNB configures the UE measurement procedures according to the roaming and access restriction information and e.g. the available multiple frequency band information. Measurements provided by the source eNB may assist the function controlling the UE's connection mobility.

2. A measurement report is triggered and sent to the eNB.

3. The source eNB makes decision based on measurement report and radio resource management (RRM) information to hand off the UE.

4. The source eNB issues a handover request message to the target eNB passing necessary information to prepare the handover at the target side (UE X2 signalling context reference at source eNB, UE S1 EPC signalling context reference, target cell identifier (ID), $K_{eNB}^*$, RRC context including the cell radio network temporary identity (C-RNTI) of the UE in the source eNB, AS-configuration, E-RAB context and physical layer ID of the source cell+ short MAC-I for possible RLF recovery). UE X2/UE S1 signalling references enable the target eNB to address the source eNB and the EPC. The E-RAB context includes necessary radio network layer (RNL) and transport network layer (TNL) addressing information, and quality of service (QoS) profiles of the E-RABs.

5. Admission control may be performed by the target eNB dependent on the received E-RAB QoS information to increase the likelihood of a successful handover, if the resources can be granted by target eNB. The target eNB configures the required resources according to the received E-RAB QoS information and reserves a C-RNTI and optionally a random access channel (RACH) preamble. The AS-configuration to be used in the target cell can either be specified independently (i.e. an "establishment") or as a delta compared to the AS-configuration used in the source cell (i.e. a "reconfiguration").

6. The target eNB prepares handover with L1/L2 and sends the handover request acknowledge message to the source eNB. The handover request acknowledge message includes a transparent container to be sent to the UE as an RRC message to perform the handover. The container includes a new C-RNTI, target eNB security algorithm identifiers for the selected security algorithms, may include a dedicated RACH preamble, and possibly some other parameters, i.e. access parameters, system information blocks (SIBs), etc. The handover request acknowledge message may also include RNL/TNL information for the forwarding tunnels, if necessary.

As soon as the source eNB receives the handover request acknowledge message, or as soon as the transmission of the handover command is initiated in the DL, data forwarding may be initiated.

Steps 7 to 11 correspond to a handover execution phase, which provides means to avoid data loss during handover.

7. The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the handover. The UE does not need to delay the handover execution for delivering the HARQ/ARQ responses to source eNB.

8. The source eNB sends the sequence number (SN) status transfer message to the target eNB to convey the UL PDCP SN receiver status and the DL PDCP SN transmitter status of E-RABs for which PDCP status preservation applies (i.e. for RLC acknowledged mode (AM)). The UL PDCP SN receiver status includes at least the PDCP SN of the first missing UL service data unit (SDU) and may include a bit map of the receive status of the out of sequence UL SDUs that the UE needs to retransmit in the target cell, if there are any such SDUs. The DL PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

9. After receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an UL buffer status report, whenever possible, to the target eNB to indicate that the handover procedure is completed for the UE. The target eNB verifies the C-RNTI sent in the RRC-ConnectionReconfigurationComplete message. The target eNB can now begin sending data to the UE.

Regarding step 7 of FIG. 4, i.e. reception of an RRCConnectionReconfiguration including the mobilityControlInfo by the UE, if the RRCConnectionReconfiguration message includes the mobilityControlInfo and the UE is able to comply with the configuration included in this message, the UE shall:

1> reset master cell group MCG MAC and SCG MAC, if configured;
1> re-establish PDCP for all RBs that are established;
1> re-establish MCG RLC and SCG RLC, if configured, for all RBs that are established;
1> configure lower layers to consider the SCell(s) other than the primary SCell (PSCell), if configured, to be in deactivated state;
1> apply the value of the newUE-Identity as the C-RNTI;
1> if the RRCConnectionReconfiguration message includes the fullConfig:
2> perform the radio configuration procedure;
1> configure lower layers in accordance with the received radioResourceConfigCommon;
1> configure lower layers in accordance with any additional fields, not covered in the previous, if included in the received mobilityControlInfo;
1> if the received RRCConnectionReconfiguration includes the sCellToReleaseList:
2> perform SCell release;
1> if the received RRCConnectionReconfiguration includes the scg-Configuration; or
1> if the current UE configuration includes one or more split data radio bearers (DRBs) and the received RRCConnectionReconfiguration includes radioResourceConfigDedicated including drb-ToAddModList:
2> perform SCG reconfiguration;
1> if the RRCConnectionReconfiguration message includes the radioResourceConfigDedicated:
2> perform the radio resource configuration procedure;
1> if the keyChangeIndicator received in the securityConfigHO is set to TRUE:
2> update the $K_{eNB}$ key based on the $K_{ASME}$ key taken into use with the latest successful NAS security mode command (SMC) procedure;
1> else:
2> update the $K_{eNB}$ key based on the current $K_{eNB}$ or the next hop, using the nextHopChainingCount value indicated in the securityConfigHO;
1> store the nextHopChainingCount value;
1> if the securityAlgorithmConfig is included in the securityConfigHO:
2> derive the $K_{RRCint}$ key associated with the integrityProtAlgorithm;
2> if connected as a relay node (RN):
3> derive the $K_{UPint}$ key associated with the integrityProtAlgorithm;
2> derive the $K_{RRCenc}$ key and the $K_{UPenc}$ key associated with the cipheringAlgorithm;
1> else:
2> derive the $K_{RRCint}$ key associated with the current integrity algorithm;
2> if connected as an RN:
3> derive the $K_{UPint}$ key associated with the current integrity algorithm;
2> derive the $K_{RRCenc}$ key and the $K_{UPenc}$ key associated with the current ciphering algorithm;
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;

1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure.

Change of secondary eNB (SeNB) procedure is described. It may refer to Section 10.1.2.8.4 of 3GPP TS 36.300 V14.1.0 (2016-12) and Section 5.3.10.10 of 3GPP TS 36.331 V14.1.0 (2016-12). The change of SeNB procedure is initiated by MeNB and used to transfer a UE context from a source SeNB to a target SeNB and to change the SCG configuration in UE from one SeNB to another. The change of SeNB procedure is one kind of handover procedure.

Figure 5:
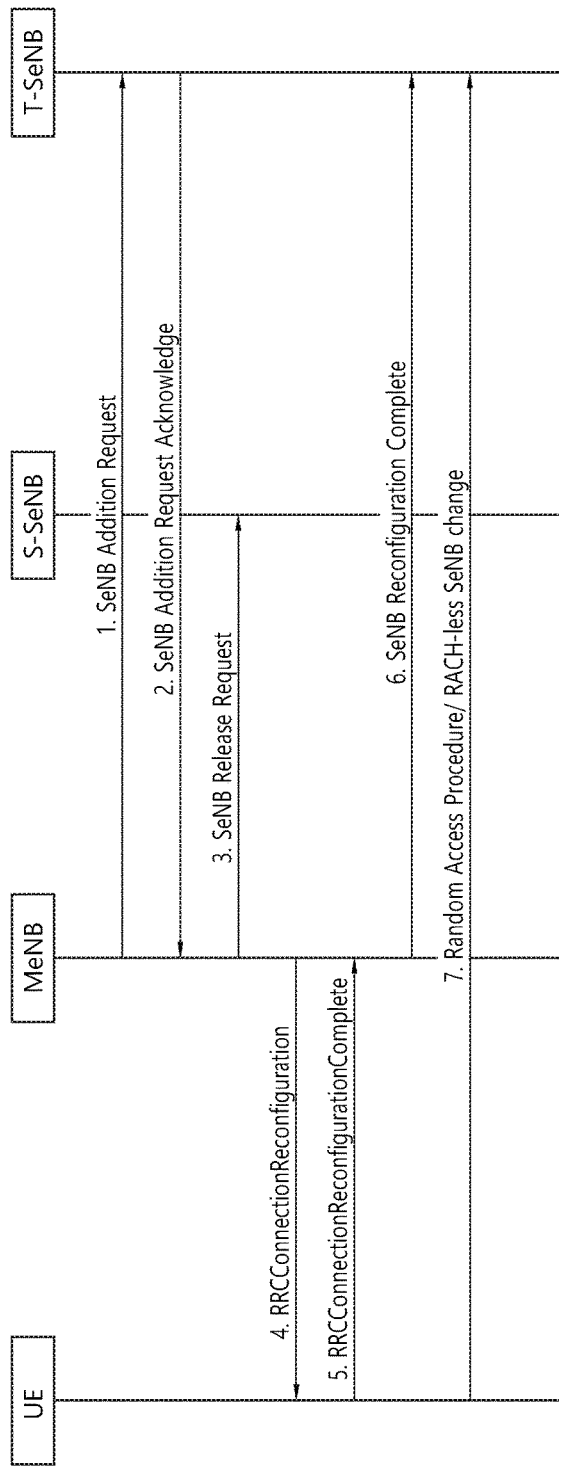
FIG. 5 shows a part of change of SeNB procedure.

FIG. 5 shows a part of change of SeNB procedure. FIG. 5 only describes the change of SeNB procedure in which the EPC does not involves. Accordingly, only UE, MeNB, source SeNB (S-SeNB) and target SeNB (T-SeNB) are described in FIG. 5.

1/2. The MeNB initiates the change of SeNB by requesting the target SeNB to allocate resources for the UE by means of the SeNB Addition Preparation procedure. MeNB includes the SCG configuration of the old SeNB in the SeNB Addition Request message. If forwarding is needed, the target SeNB provides forwarding addresses to the MeNB.

3. If the allocation of target SeNB resources was successful, the MeNB initiates the release of the source SeNB resources towards the UE and the source SeNB. If data forwarding is needed the MeNB provides data forwarding addresses to the source SeNB. Either direct data forwarding or indirect data forwarding is used for SCG bearer. Only indirect data forwarding is used for split bearer. Reception of the SeNB Release Request message triggers the source SeNB to stop providing user data to the UE and, if applicable, to start data forwarding.

4/5. The MeNB triggers the UE to apply the new configuration. The MeNB indicates the new configuration in the RRCConnectionReconfiguration message towards the UE. In case the UE is unable to comply with (part of) the configuration included in the RRCConnectionReconfiguration message, it performs the reconfiguration failure procedure.

6. If the RRC connection reconfiguration procedure was successful, the MeNB informs the target SeNB.

7. The UE synchronizes to the target SeNB.

Regarding step 4 of FIG. 5, if the UE receives RRCConnectionReconfiguration including the scg-Configuration, the UE performs SCG reconfiguration. The UE shall:

1> if the received scg-Configuration is set to release or includes the mobilityControlInfoSCG (i.e. SCG release/change):
2> if mobilityControlInfo is not received (i.e. SCG release/change without handover):
3> reset SCG MAC, if configured;
3> for each drb-Identity value that is part of the current UE configuration:
4> if the DRB indicated by drb-Identity is an SCG DRB:
5> re-establish the PDCP entity and the SCG RLC entity or entities;
4> if the DRB indicated by drb-Identity is a split DRB:
5> perform PDCP data recovery and re-establish the SCG RLC entity;
4> if the DRB indicated by drb-Identity is an MCG DRB; and
4> drb-ToAddModListSCG is received and includes the drb-Identity value, while for this entry drb-Type is included and set to scg (i.e. MCG to SCG):
5> re-establish the PDCP entity and the MCG RLC entity or entities;
3> configure lower layers to consider the SCG SCell(s), except for the PSCell, to be in deactivated state;
1> if the received scg-Configuration is set to release:
2> release the entire SCG configuration, except for the DRB configuration (i.e. as configured by drb-ToAddModListSCG);
2> if the current UE configuration includes one or more split or SCG DRBs and the received RRCConnectionReconfiguration message includes radioResourceConfigDedicated including drb-ToAddModList:
3> reconfigure the SCG or split DRB by drb-ToAddModList;
2> stop timer T313, if running;
2> stop timer T307, if running;
1> else:
2> if the received scg-ConfigPartMCG includes the scg-Counter:
3> update the S-$K_{eNB}$ key based on the $K_{eNB}$ key and using the received scg-Counter value;
3> derive the $K_{UPenc}$ key associated with the cipheringAlgorithmSCG included in mobilityControlInfoSCG within the received scg-ConfigPartSCG;
3> configure lower layers to apply the ciphering algorithm and the $K_{UPenc}$ key;
2> if the received scg-ConfigPartSCG includes the radioResourceConfigDedicatedSCG:
3> reconfigure the dedicated radio resource configuration for the SCG;
2> if the current UE configuration includes one or more split or SCG DRBs and the received RRCConnectionReconfiguration message includes radioResourceConfigDedicated including drb-ToAddModList:
3> reconfigure the SCG or split DRB by drb-ToAddModList;
2> if the received scg-ConfigPartSCG includes the sCellToReleaseListSCG:
3> perform SCell release for the SCG;
2> if the received scg-ConfigPartSCG includes the pSCellToAddMod:
3> perform PSCell addition or modification;
2> if the received scg-ConfigPartSCG includes the sCellToAddModListSCG:
3> perform SCell addition or modification;
2> configure lower layers in accordance with mobilityControlInfoSCG, if received;
2> if the received scg-ConfigPartSCG includes the mobilityControlInfoSCG (i.e. SCG change):
3> resume all SCG DRBs and resume SCG transmission for split DRBs, if suspended;
3> stop timer T313, if running;
3> start timer T307 with the timer value set to t307, as included in the mobilityControlInfoSCG;
3> start synchronizing to the DL of the target PSCell;
3> initiate the random access procedure on the PSCell:
3> the procedure ends, except that the following actions are performed when MAC successfully completes the random access procedure on the PSCell:
4> stop timer T307;
4> apply the parts of the CQI reporting configuration, the scheduling request configuration and the sounding RS configuration that do not require the UE to know the system frame number (SFN) of the target PSCell, if any;

4> apply the parts of the measurement and the radio resource configuration that require the UE to know the SFN of the target PSCell (e.g. periodic channel quality indicator (CQI) reporting, scheduling request configuration, sounding reference signal (RS) configuration), if any, upon acquiring the SFN of the target PSCell;

"Make-Before-Break" handover/SeNB change is described. It is considered to introduce Make-Before-Break handover/SeNB change in LTE-ARrel-14. Make-Before-Break handover/SeNB change is maintaining source eNB/SeNB connection after reception of RRC message for handover or change of SeNB (i.e. RRCConnectionReconfiguration message) before the initial UL transmission to the target eNB during handover or change of SeNB. For example, if Make-Before-Break handover is configured, the connection to the source cell may be maintained after the reception of RRCConnectionReconfiguration message with mobilityControlInformation before the UE executes initial UL transmission to the target cell. If Make-Before-Break SeNB change is configured, the connection to the source SeNB may be maintained after the reception of RRCConnectionReconfiguration message with mobilityControlInfoSCG before the UE executes initial UL transmission to the target cell.

If Make-Before-Break handover or SeNB change is configured, mobilityControlInformation information element (IE) included in RRCConnectionReconfiguration message may be configured by Table 1 below.

```
-- ASN1START
MobilityControlInfo ::= SEQUENCE {
  targetPhysCellId PhysCellId,
  carrierFreqCarrierFreq EUTRA OPTIONAL, -- Cond HO-toEUTRA2
  carrierBandwidth CarrierBandwidthEUTRAOPTIONAL, -- Cond HO-toEUTRA
  additionalSpectrumEmission AdditionalSpectrumEmission OPTIONAL,
  -- Cond HO-toEUTRA
  t304 ENUMERATED {
    ms50, ms100, ms150, ms200, ms500, ms1000,
    ms2000, ms10000-v1310},
  newUE-Identity C-RNTI,
  radioResourceConfigCommon RadioResourceConfigCommon,
  rach-ConfigDedicated RACH-ConfigDedicated OPTIONAL, -- Need OP
  ...,
  [[carrierFreq-v9e0 CarrierFreqEUTRA-v9e0 OPTIONAL -- Need ON
  ]],
  [[drb-ContinueROHC-r11 ENUMERATED {true} OPTIONAL -- Cond HO
  ]],
  [[mobilityControlInfoV2X-r14 MobilityControlInfoV2X-r14 OPTIONAL
    -- Need OR
  ]],
  [[makeBeforeBreak-r14 ENUMERATED {true} OPTIONAL, -- Need OR
    rach-Skip-r14 RACH-Skip-r14 OPTIONAL -- Need OR
  ]]
}
MobilityControlInfoSCG-r12 ::= SEQUENCE {
  t307 ENUMERATED {
    ms50, ms100, ms150, ms200, ms500, ms1000,
    ms2000, spare1},
  ue-IdentitySCG-r12 C-RNTI OPTIONAL, -- Cond SCGEst,
  rach-ConfigDedicated-r12 RACH-ConfigDedicated OPTIONAL, -- Need OP
  cipheringAlgorithmSCG-r12 CipheringAlgorithm-r12 OPTIONAL, -- Need ON
  ...,
  [[makeBeforeBreakSCG-r14 ENUMERATED {true} OPTIONAL, -- Need OR
    rach-SkipSCG-r14 RACH-Skip-r14 OPTIONAL -- Need OR
  ]]
}
...

RACH-Skip-r14 ::= SEQUENCE {
  targetTA-r14 CHOICE {
    ta0-r14 NULL,
    ptag-r14 NULL,
    pstag-r14 NULL,
    mcg-STAG-r14 STAG-Id-r11,
    scg-STAG-r14 STAG-Id-r11
  },
  ul-ConfigInfo-r14 SEQUENCE {
    numberOfConfUL-Processes-r14 INTEGER (1..8),
    ul-SchedInterval-r14 ENUMERATED {sf1, sf2, sf5, sf10},
    ul-StartSubframe-r14 INTEGER (0..9),
    ul-Grant-r14 BIT STRING (SIZE (16))
  } OPTIONAL -- Need OR
}
-- ASN1STOP
```

Referring Table 1, mobilayControlInformation IE may include makeBeforeBreak field, which indicates whether the UE shall continue UL transmission/DL reception with the source cell(s) before performing the first transmission through physical random access channel (PRACH) to the target PCell, or through PUSCH to the target PCell while rach-Skip is configured. rach-Skip field indicates whether random access procedure for the target PCell is skipped.

Furthermore, mobilayControlInformation IE may include makeBeforeBreakSCG field, which indicates whether the UE shall continue UL transmission/DL reception with the source cell(s) before performing the first transmission through PRACH to the target PSCell, or through PUSCH to the target PSCell while rach-SkipSCG is configured. rach-SkipSCG field indicates whether random access procedure for the target PSCell is skipped.

If Make-Before-Break handover is configured, i.e. if mobilityControlInformation IE includes makeBeforeBreak field, UE operation upon receiving the RRCConnechonReconfigurahon message including mobilayControlInformation IE may be modified as follows. The UE shall:
1> if makeBeforeBreak is configured:
2> start synchronizing to the DL of the target PSCell, if mobilityControlInfoSCG is included;
2> if rach-Skip is configured:
3> if ul-ConfigInfo is configured:
4> continue the UL transmission/DL reception with the source cell(s) after the reception of the RRCConnechonReconfigurahon message including the mobilayControlInfo and before the first transmission of PUSCH to the target PCell, according to the ul-ConfigInfo of the target PCell;
3> else:
4> continue the UL transmission/DL reception with the source cell(s) after the reception of the RRCConnechonReconfigurahon message including the mobilayControlInfo and before the UE is ready to monitor the PDCCH of the target PCell;
2> else:
3> continue the UL transmission/DL reception with the source cell(s) after the reception of the RRCConnectionReconfiguration message including the mobilityControlInfo and before the first transmission of PRACH to the target PCell;

It is up to UE implementation when to stop the UL transmission/DL reception with the source cell(s) to initiate re-tuning for connection to the target cell, if makeBeforeBreak is configured.
1> reset master cell group MCG MAC and SCG MAC, if configured;
1> re-establish PDCP for all RBs that are established;

1> re-establish MCG RLC and SCG RLC, if configured, for all RBs that are established;
1> configure lower layers to consider the SCell(s) other than the primary SCell (PSCell), if configured, to be in deactivated state;
1> apply the value of the newUE-Identity as the C-RNTI;
1> if the RRCConnectionReconfiguration message includes the fullConfig:
    2> perform the radio configuration procedure;
1> configure lower layers in accordance with the received radioResourceConfigCommon;
1> if the received RRCConnectionReconfiguration message includes the rach-Skip:
    2> apply the $N_{TA}$ value for the target MCG PTAG, as indicated by targetTA in rach-Skip;
1> configure lower layers in accordance with any additional fields, not covered in the previous, if included in the received mobilityControlInfo;
1> if the received RRCConnectionReconfiguration includes the sCellToReleaseList:
    2> perform SCell release;
1> if the received RRCConnectionReconfiguration includes the scg-Configuration; or
1> if the current UE configuration includes one or more split data radio bearers (DRBs) and the received RRCConnectionReconfiguration includes radioResourceConfigDedicated including drb-ToAddModList:
    2> perform SCG reconfiguration;
1> if the RRCConnectionReconfiguration message includes the radioResourceConfigDedicated:
    2> perform the radio resource configuration procedure;
1> if the keyChangeIndicator received in the securityConfigHO is set to TRUE:
    2> update the $K_{eNB}$ key based on the $K_{ASME}$ key taken into use with the latest successful NAS security mode command (SMC) procedure;
1> else:
    2> update the $K_{eNB}$ key based on the current $K_{eNB}$ or the next hop, using the nextHopChainingCount value indicated in the securityConfigHO;
1> store the nextHopChainingCount value;
1> if the securityAlgorithmConfig is included in the securityConfigHO:
    2> derive the $K_{RRcint}$ key associated with the integrityProtAlgorithm;
    2> if connected as a relay node (RN):
        3> derive the $K_{UPint}$ key associated with the integrityProtAlgorithm;
    2> derive the $K_{RRCenc}$ key and the $K_{UPenc}$ key associated with the cipheringAlgorithm;
1> else:
    2> derive the $K_{RRcint}$ key associated with the current integrity algorithm;
    2> if connected as an RN:
        3> derive the $K_{UPint}$ key associated with the current integrity algorithm;
    2> derive the $K_{RRCenc}$ key and the $K_{UPenc}$ key associated with the current ciphering algorithm;
1> configure lower layers to apply the integrity protection algorithm and the $K_{RRcint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure.

If Make-Before-Break SeNB change is configured, i.e. if mobilityControlInformation IE includes makeBeforeBreakSCG field, UE operation upon receiving the RRCConnectionReconfiguration message including mobilityControlInformation IE may be modified as follows. The UE shall:
1> if makeBeforeBreakSCG is configured:
    2> stop timer T313, if running;
    2> start timer T307 with the timer value set to t307, as included in the mobilityControlInfoSCG;
    2> start synchronizing to the DL of the target PSCell, if needed;
    2> if rach-SkipSCG is configured:
        3> if ul-ConfigInfo is configured in rach-SkipSCG:
            4> continue the UL transmission/DL reception with the source cell(s) after the reception of the makeBeforeBreakSCG and before the first transmission of PUSCH to the target PSCell, according to the ul-ConfigInfo of the target PSCell;
        3> else:
            4> continue the UL transmission/DL reception with the source cell(s) after the reception of the makeBeforeBreakSCG and before the UE is ready to monitor the PDCCH of the target PSCell;
    2> else:
        3> continue the UL transmission/DL reception with the source cell(s) after the reception of the makeBeforeBreakSCG and before the first transmission of PRACH to the target PSCell;

It is up to UE implementation when to stop the UL transmission/DL reception with the source cell(s) to initiate re-tuning for the connection to the target cell, if makeBeforeBreakSCG is configured.
1> if rach-SkipSCG is configured:
    2> apply the $N_{TA}$ value for the target SCG PTAG, as indicated by targetTA in rach-SkipSCG;
1> if the received scg-Configuration is set to release or includes the mobilityControlInfoSCG (i.e. SCG release/change):
    2> if mobilityControlInfo is not received (i.e. SCG release/change without handover):
        3> reset SCG MAC, if configured;
        3> for each drb-Identity value that is part of the current UE configuration:
            4> if the DRB indicated by drb-Identity is an SCG DRB:
                5> re-establish the PDCP entity and the SCG RLC entity or entities;
            4> if the DRB indicated by drb-Identity is a split DRB:
                5> perform PDCP data recovery and re-establish the SCG RLC entity;
            4> if the DRB indicated by drb-Identity is an MCG DRB; and
            4> drb-ToAddModListSCG is received and includes the drb-Identity value, while for this entry drb-Type is included and set to scg (i.e. MCG to SCG):
                5> re-establish the PDCP entity and the MCG RLC entity or entities;
        3> configure lower layers to consider the SCG SCell(s), except for the PSCell, to be in deactivated state;
    1> if the received scg-Configuration is set to release:
        2> release the entire SCG configuration, except for the DRB configuration (i.e. as configured by drb-ToAddModListSCG);
        2> if the current UE configuration includes one or more split or SCG DRBs and the received RRCConnectionReconfiguration message includes radioResourceConfigDedicated including drb-ToAddModList:
 3> reconfigure the SCG or split DRB by drb-ToAddModList;
 2> stop timer T313, if running;
 2> stop timer T307, if running;
 1> else:
 2> if the received scg-ConfigPartMCG includes the scg-Counter:
 3> update the S-$K_{eNB}$ key based on the $K_{eNB}$ key and using the received scg-Counter value;
 3> derive the $K_{UPenc}$ key associated with the cipheringAlgorithmSCG included in mobilityControlInfoSCG within the received scg-ConfigPartSCG;
 3> configure lower layers to apply the ciphering algorithm and the $K_{UPenc}$ key;
 2> if the received scg-ConfigPartSCG includes the radioResourceConfigDedicatedSCG:
 3> reconfigure the dedicated radio resource configuration for the SCG;
 2> if the current UE configuration includes one or more split or SCG DRBs and the received RRCConnectionReconfiguration message includes radioResourceConfigDedicated including drb-ToAddModList:
 3> reconfigure the SCG or split DRB by drb-ToAddModList;
 2> if the received scg-ConfigPartSCG includes the sCellToReleaseListSCG:
 3> perform SCell release for the SCG;
 2> if the received scg-ConfigPartSCG includes the pSCellToAddMod:
 3> perform PSCell addition or modification;
 2> if the received scg-ConfigPartSCG includes the sCellToAddModListSCG:
 3> perform SCell addition or modification;
 2> configure lower layers in accordance with mobilityControlInfoSCG, if received;
 2> if the received scg-ConfigPartSCG includes the mobilityControlInfoSCG (i.e. SCG change):
 3> resume all SCG DRBs and resume SCG transmission for split DRBs, if suspended;
 3> stop timer T313, if running;
 3> start timer T307 with the timer value set to t307, as included in the mobilityControlInfoSCG, if makeBeforeBreakSCG is not configured;
 3> start synchronizing to the DL of the target PSCell, if needed;
 3> initiate the random access procedure on the PSCell, if rach-SkipSCG is not configured:
 3> the procedure ends, except that the following actions are performed when MAC successfully completes the random access procedure on the PSCell:
 4> stop timer T307;
 4> release rach-SkipSCG, if configured;
 4> apply the parts of the CQI reporting configuration, the scheduling request configuration and the sounding RS configuration that do not require the UE to know the system frame number (SFN) of the target PSCell, if any;
 4> apply the parts of the measurement and the radio resource configuration that require the UE to know the SFN of the target PSCell (e.g. periodic channel quality indicator (CQI) reporting, scheduling request configuration, sounding reference signal (RS) configuration), if any, upon acquiring the SFN of the target PSCell;

The problem of the prior art is described. As described above, when the UE receives RRCConnectionReconfiguration message including mobilityControlInformation for handover/SeNB change, the UE resets MAC, re-establishes RLC/PDCP for all RBs and then applies the new RRC configuration and new security to be used in/for the target cell. After all these things done, the RRC layer generates RRCConnectionReconfigurationComplete message and delivers it to the MAC layer. Then, the MAC layer performs random access procedure to target cell by using the PRACH resource newly configured by the RRC layer. The UE should perform RRC procedures in order that is described above. In other words, the UE is not allowed to perform the next behavior until the prior behavior is performed.

Meanwhile, Table 2 shows reproducing of the above described UE operation, upon receiving the RRCConnectionReconfiguration message including mobilityControlInformation IE when Make-Before-Break handover is configured.

TABLE 2

1> if makeBeforeBreak is configured:
 2> start synchronizing to the DL of the target PSCell, if mobilityControlInfoSCG is included;
 2> if rach-Skip is configured:
 3> if ul-ConfigInfo is configured:
 4> continue the UL transmission/DL reception with the source cell(s) after the reception of the RRCConnectionReconfiguration message including the mobilityControlInfo and before the first transmission of PUSCH to the target PCell, according to the ul-ConfigInfo of the target PCell;
 3> else:
 4> continue the UL transmission/DL reception with the source cell(s) after the reception of the RRCConnectionReconfiguration message including the mobilityControlInfo and before the UE is ready to monitor the PDCCH of the target PCell;
 2> else:
 3> continue the UL transmission/DL reception with the source cell(s) after the reception of the RRCConnectionReconfiguration message including the mobilityControlInfo and before the first transmission of PRACH to the target PCell;
It is up to UE implementation when to stop the UL transmission/DL reception with the source cell(s) to initiate re-tuning for connection to the target cell, if makeBeforeBreak is configured.
1> reset master cell group MCG MAC and SCG MAC, if configured;
1> re-establish PDCP for all RBs that are established;
1> re-establish MCG RLC and SCG RLC, if configured, for all RBs that
are established;
1> configure lower layers to consider the SCell(s) other than the primary
SCell (PSCell), if configured, to be in deactivated state;
1> apply the value of the newUE-Identity as the C-RNTI;
1> if the RRCConnectionReconfiguration message includes the fullConfig:
 2> perform the radio configuration procedure;
1> configure lower layers in accordance with the received radioResourceConfigCommon;
1> if the received RRCConnectionReconfiguration message includes the rach-Skip:
 2> apply the $N_{TA}$ value for the target MCG PTAG, as indicated by targetTA in rach-Skip;
1> configure lower layers in accordance with any additional fields, not covered in the previous, if included in the received mobilityControlInfo;
1> if the received RRCConnectionReconfiguration includes the sCellToReleaseList:
 2> perform SCell release;
1> if the received RRCConnectionReconfiguration includes the scg-Configuration; or
1> if the current UE configuration includes one or more split data radio bearers (DRBs) and the received RRCConnectionReconfiguration includes radioResourceConfigDedicated including drb-ToAddModList:
 2> perform SCG reconfiguration;
...

Referring to Table 2, in order to keep communication with source cell with makeBeforeBreak, at first, the UE should perform RRC procedures regarding Make-Before-Break handover, i.e. from the part "1> if makeBeforeBreak is configured". Then, the UE should perform remaining RRC procedures, e.g. reset MAC (the "1> reset master cell group MCG MAC and SCG MAC, if configured" in Table 2), re-establish PDCP/RLC for all RBs (the part "1> re-establish PDCP for all RBs that are established" and "1> re-establish MCG RLC and SCG RLC, if configured, for all RBs that are established" in Table 2), apply newUE-Identity (the part "1> apply the value of the newUE-Identity as the C-RNTI" in Table 2), reconfigure according to fullConfig (the part "1> if the RRCConnectionReconfiguration message includes the fullConfig: 2> perform the radio configuration procedure" in Table 2), etc.

However, performing all these RRC procedures will, in return, disallow communication with the source cell. In other words, even if the UE is configured with Make-Before-Break handover, the UE may be not allowed to communicate with the source cell, because MAC/PDCP/RLC are reset/re-established. The problem described above may be applied to Make-Before-Break SeNB change as well.

Therefore, a new mechanism is needed to delay some RRC procedures (or partially perform some RRC procedures) in order to enable communicating with the source cell if the UE is configured with Make-Before-Break handover. And, the delayed RRC procedure needs to be performed at some point after the UE stops communicating with the source cell and starts communicating with the target cell.

Hereinafter, a method for performing a Make-Before-Break handover according to an embodiment of the present invention is described.

Figure 6:
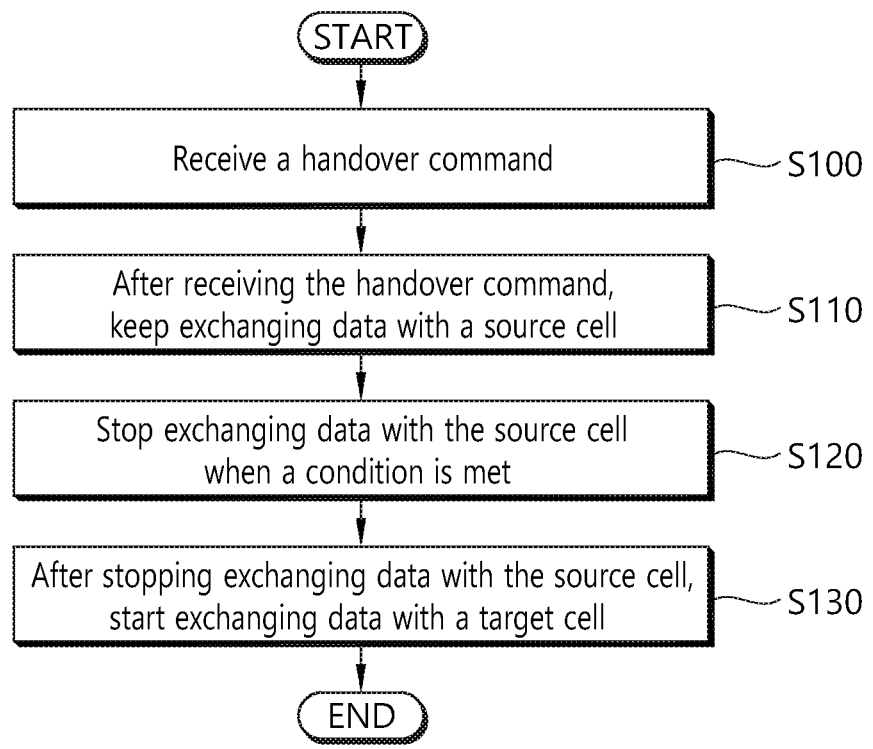
FIG. 6 shows a method for performing a Make-Before-Break handover according to an embodiment of the present invention.

FIG. 6 shows a method for performing a Make-Before-Break handover according to an embodiment of the present invention. In the description below, Make-Before-Break or makeBeforeBreak refers to a feature that allows or enables UE to communicate with the source cell while performing handover or SCG change procedure. And, handover procedure refers to a handover procedure and/or SCG change procedure described above. Handover may include handover between multiple SCGs. In this embodiment, if a UE is configured with makeBeforeBreak by a network, the UE performs a handover procedure as follows.

In step S100, a UE receives a handover command from a network. Upon receiving the handover command, the UE may perform the following RRC procedures.

The UE may perform PDCP re-establishment only for a part of RBs configured for the UE. The part of RBs may be a signaling radio bearer (SRB), or a RB for which data transmission is to be stopped during handover procedure. That is, the UE may not perform PDCP re-establishment for DRB.

The UE may perform RLC re-establishment only for a part of RBs configured for the UE. The part of RBs may be a SRB and/or a RB that belongs to SCG, and/or a RB for which data transmission is to be stopped during handover procedure. That is, the UE may not perform RLC re-establishment for DRB, and/or a RB that belongs to MCG.

The UE may derive a new security key only for a part of RBs configured for the UE. The part of RBs may be SRB, and/or, a RB that belongs to SCG, and/or a RB for which data transmission is to be stopped during handover procedure.

The UE may perform MAC reset only for a certain MAC entity among multiple MAC entities. The certain MAC entity may be a SCG MAC entity, or a MAC entity of which data transmission is stopped.

The UE may not perform any radio configuration procedure which disables data communication between the UE and the source cell. For example, the UE may not release/clear all current common radio configurations. The UE may not release the PDCP entity, RLC entity, DTCH logical channels.

In step S110, after receiving the handover command from the network, the UE keeps exchanging data with a source cell. That is, the UE keeps transmitting and/or receiving data to/from the source cell. The UE may keep using old C-RNTI in order to communicate with the current source cell.

In step S120, the UE stops exchanging data with the source cell when a condition is met. The UE may stop transmitting and/or receiving data to/from the source cell, if one of following conditions is met.

when the first transmission of PUSCH to the target PCell occurs;
when the UE is ready to monitor the PDCCH of the target PCell;
when the first transmission of PRACH to the target PCell occurs;
when the RRCConnetionReconfigurationComplete message is submitted from the RRC layer to lower layers, e.g. Layer 2 or Layer 1;
when the UE transmits RRCConnectionReconfiguration-Complete message to the network;
when a certain time period expires before transmitting the first PUSCH to the target PCell;
when the UE L2 buffer is empty.

After stopping transmitting and/or receiving data to/from the source cell, the UE may proceed the following RRC procedures.

The UE may perform PDCP/RLC re-establishment for RBs that are not re-established in step S100 upon receiving the handover command. Or, the UE may perform PDCP/RLC re-establishment for all RBs.

The UE may perform MAC reset for the MAC entities that are not reset in step S100 upon receiving the handover command. Or, the UE may perform MAC reset for all MAC entities.

The UE may derive a new security key for RBs of which new security key is not derived in step S100 upon receiving the handover command. Or, the UE may derive a new security key for all RBs.

The UE may configure PDCP/RLC/MAC according to the received handover command.

Alternatively, the UE may perform whole handover procedure again except for, e.g. submitting RRCConnection-ReconfiguationComplete message to Layer 2 or Layer 1.

In step S130, after stopping exchanging data with the source cell, the UE starts exchanging data with a target cell. That is, the UE starts transmission and/or reception of data to/from the target cell.

Figure 7:
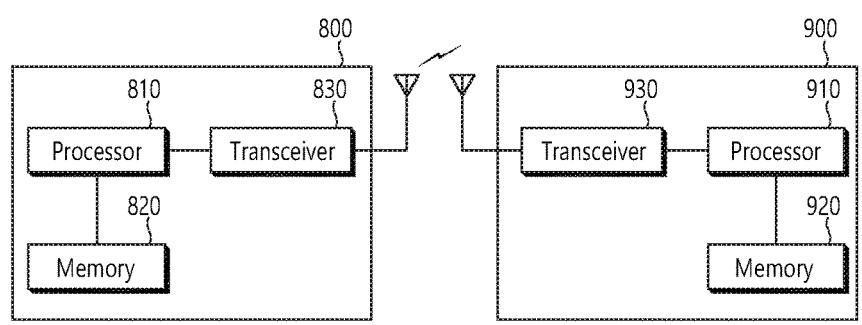
FIG. 7 shows a wireless communication system to implement an embodiment of the present invention.

FIG. 7 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, Make-Before-Break handover/SeNB change can be performed without ambiguity. That is, if the UE is configured with Make-Before-Break handover, the UE can communicate with the source cell for RBs of which PDCP/RLC are not re-established or of which MAC is not reset, upon receiving a handover command from a network.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing a make-before-break handover by a user equipment (UE) in a wireless communication system, the method comprising:
   receiving a handover command from a network;
   upon receiving the handover command from the network:
      keeping exchanging data with a source cell;
      performing a media access control (MAC) reset only for a MAC entity of which data transmission is stopped or a secondary cell group (SCG) MAC entity; and
      stopping exchanging data with the source cell when a condition is met; and
   upon stopping exchanging data with the source cell:
      performing a MAC reset for remaining MAC entities of the MAC entity or the SCG MAC entity which are not reset; and
      starting exchanging data with a target cell.

2. The method of claim 1, further comprising:
   performing a packet data convergence protocol (PDCP) re-establishment only for one of a radio bearer (RB) or a signaling radio bearer (SRB) of a corresponding one of the MAC entity or the SCG MAC entity for which data transmission is to be stopped during a handover procedure, upon receiving the handover command; and
   performing a PDCP re-establishment for remaining RBs of the corresponding one of the MAC entity or the SCG MAC entity which are not re-established, upon the stopping exchanging data with the source cell.

3. The method of claim 1, further comprising:
   performing a radio link control (RLC) re-establishment only for one of a radio bearer (RB) or a signaling radio bearer (SRB) of a corresponding one of the MAC entity or the SCG MAC entity for which data transmission is to be stopped during a handover procedure, upon receiving the handover command; and
   performing a RLC re-establishment for remaining RBs of the corresponding one of the MAC entity or the SCG MAC entity which are not re-established, upon the stopping exchanging data with the source cell.

4. The method of claim 1, further comprising:
   deriving a new security key only for one of a radio bearer (RB) or a signaling radio bearer (SRB) of a corresponding one of the MAC entity or the SCG MAC entity for which data transmission is to be stopped during a handover procedure, upon receiving the handover command; and
   deriving a new security key for remaining RBs of the corresponding one of the MAC entity or the SCG MAC entity of which new security key is not derived, upon the stopping exchanging data with the source cell.

5. The method of claim 1, wherein the keeping exchanging data with the source cell comprises using a pre-handover cell radio network temporary identity (C-RNTI).

6. The method of claim 1, wherein when the condition is met comprises at least one of:
   when a first transmission of a physical uplink shared channel (PUSCH) to a target primary cell (PCell) occurs, or
   when the UE is ready to monitor a physical downlink control channel (PDCCH) of the target PCell, or
   when a first transmission of a physical random access channel (PRACH) to the target PCell occurs, or
   when a radio resource control (RRC) connection reconfiguration complete message is submitted from a RRC layer to lower layers, or
   when the UE transmits the RRC connection reconfiguration complete message to the network, or
   when a certain time period expires before transmitting the first PUSCH to the target PCell, or
   when the UE L2 buffer is empty.

7. A user equipment (UE) in a wireless communication system, the UE comprising:
   a memory;
   a transceiver; and
   a processor, operably coupled to the memory and the transceiver, that:
      controls the transceiver to receive a handover command from a network,
      upon receiving the handover command from the network:
         controls the transceiver to keep maintain a data exchange with a source cell;
         performs a media access control (MAC) reset only for a MAC entity of which data transmission is stopped or a secondary cell group (SCG) MAC entity; and
         controls the transceiver to stop exchanging data with the source cell when a condition is met; and upon stopping exchanging data with the source cell:
  performs a MAC reset for remaining MAC entities of the MAC entity or the SCG MAC entity which are not reset; and
  controls the transceiver to start exchanging data with a target cell.

8. The UE of claim 7, wherein the processor further:
performs a packet data convergence protocol (PDCP) re-establishment only for one of a radio bearer (RB) or a signaling radio bearer (SRB) of a corresponding one of the MAC entity or the SCG MAC entity for which data transmission is to be stopped during a handover procedure, upon receiving the handover command, and
performs a PDCP re-establishment for remaining RBs of the corresponding one of the MAC entity or the SCG MAC entity which are not re-established, upon the stopping exchanging data with the source cell.

9. The UE of claim 7, wherein the processor further:
performs a radio link control (RLC) re-establishment only for one of a radio bearer (RB) or a signaling radio bearer (SRB) of a corresponding one of the MAC entity or the SCG MAC entity for which data transmission is to be stopped during a handover procedure, upon receiving the handover command; and
performs a RLC re-establishment for remaining RBs of the corresponding one of the MAC entity or the SCG MAC entity which are not re-established, upon the stopping exchanging data with the source cell.

10. The UE of claim 7, wherein the processor further:
derives a new security key only for one of a radio bearer (RB) or a signaling radio bearer (SRB) of a corresponding one of the MAC entity or the SCG MAC entity for which data transmission is to be stopped during a handover procedure, upon receiving the handover command; and
derives a new security key for remaining RBs of the corresponding one of the MAC entity or the SCG MAC entity of which new security key is not derived, upon the stopping exchanging data with the source cell.

11. The UE of claim 7, wherein keeping exchanging data with the source cell comprises using a pre-handover cell radio network temporary identity (C-RNTI).

12. The UE of claim 7, wherein when the condition comprises at least one of:
  when a first transmission of a physical uplink shared channel (PUSCH) to a target primary cell (PCell) occurs, or
  when the UE is ready to monitor a physical downlink control channel (PDCCH) of the target PCell, or
  when a first transmission of a physical random access channel (PRACH) to the target PCell occurs, or
  when a radio resource control (RRC) connection reconfiguration complete message is submitted from a RRC layer to lower layers, or
  when the UE transmits the RRC connection reconfiguration complete message to the network, or
  when a certain time period expires before transmitting the first PUSCH to the target PCell, or
  when the UE L2 buffer is empty.

* * * * *